US011180327B2

(12) United States Patent
Meurer

(10) Patent No.: US 11,180,327 B2
(45) Date of Patent: Nov. 23, 2021

(54) METHOD FOR AUTOMATICALLY STACKING PACKAGES IN LAYERS ON A SUPPORT

(71) Applicant: Dematic GmbH, Heusenstamm (DE)

(72) Inventor: Hans Christoph Meurer, Framersheim (DE)

(73) Assignee: Dematic GmbH, Heusenstamm (DE)

( * ) Notice: Subject to any disclaimer, the term of this patent is extended or adjusted under 35 U.S.C. 154(b) by 193 days.

(21) Appl. No.: 16/498,871

(22) PCT Filed: Mar. 22, 2018

(86) PCT No.: PCT/EP2018/057276
§ 371 (c)(1),
(2) Date: Sep. 27, 2019

(87) PCT Pub. No.: WO2018/177875
PCT Pub. Date: Oct. 4, 2018

(65) Prior Publication Data
US 2020/0048017 A1 Feb. 13, 2020

(30) Foreign Application Priority Data
Mar. 29, 2017 (DE) .......................... 102017106746.9

(51) Int. Cl.
*B65G 57/00* (2006.01)
*B65G 1/137* (2006.01)
(Continued)

(52) U.S. Cl.
CPC ........... *B65G 57/00* (2013.01); *B65G 1/1373* (2013.01); *B65G 47/261* (2013.01); *B65G 61/00* (2013.01); *B65G 2203/04* (2013.01)

(58) Field of Classification Search
CPC .... B65G 57/00; B65G 1/1373; B65G 47/261; B65G 61/00; B65G 2203/04;
(Continued)

(56) References Cited

U.S. PATENT DOCUMENTS 2,883,074 A 4/1959 Boehl et al.
2,979,872 A 4/1961 Verrinder
(Continued)

FOREIGN PATENT DOCUMENTS

CN 102101593 6/2011
CN 104030046 9/2014
(Continued)

OTHER PUBLICATIONS

International Search Report of the International Searching Authority from corresponding Patent Cooperation Treaty (PCT) Application No. PCT/EP2018/057276, indicated completed on Jun. 19, 2018.
(Continued)

*Primary Examiner* — Gregory W Adams
(74) *Attorney, Agent, or Firm* — Gardner, Linn, Burkhart & Ondersma LLP

(57) ABSTRACT

A method for automatically stacking packages of different sizes in layers on a support in a specified spatial arrangement so as to form a stack by determining the order and spatial position of the packages of different sizes in the stack to be formed in a computer-assisted manner, including by placing the individual packages in an order by a conveyor system, and transporting the packages to be loaded from the conveyor system to the pre-calculated spatial positions on the support or the stack being formed on the support using the handling means of a stacking device. The specified order and the specified spatial position of the packages are used to computationally check whether at least two packages following each other on a conveyor system path leading to the
(Continued)

stacking device can be transported together to the pre-calculated spatial positions by the handling means.

16 Claims, 7 Drawing Sheets

(51) Int. Cl.
 *B65G 47/26* (2006.01)
 *B65G 61/00* (2006.01)
(58) Field of Classification Search
 CPC .. B65G 1/1378; B65G 57/24; B65H 2511/10; Y10S 414/116; G05B 2219/40006
 See application file for complete search history.

(56) References Cited

U.S. PATENT DOCUMENTS

| | | | |
|---|---|---|---|
| 3,056,513 A | 10/1962 | Von Gal | |
| 3,066,579 A | 12/1962 | Brush | |
| 3,068,624 A | 12/1962 | Linda | |
| 3,257,015 A | 6/1966 | Annable et al. | |
| 3,340,672 A | 9/1967 | Kayser | |
| 3,529,732 A | 9/1970 | Wayne | |
| 3,543,949 A | 12/1970 | Weier et al. | |
| 3,594,977 A | 7/1971 | Grasvoll | |
| 3,605,377 A | 9/1971 | Sabel | |
| 3,612,300 A | 10/1971 | Berghgracht | |
| 2,090,129 A | 8/1973 | Kimball et al. | |
| 3,901,391 A | 8/1975 | Carlson et al. | |
| 3,923,144 A | 12/1975 | Langen | |
| 3,967,737 A | 7/1976 | Peralta et al. | |
| 3,986,621 A | 10/1976 | Bowser | |
| 4,018,031 A | 4/1977 | Smaw | |
| 4,132,318 A | 1/1979 | Wang et al. | |
| 4,162,016 A | 7/1979 | Schmitt | |
| 4,205,934 A | 6/1980 | Pantin et al. | |
| 4,214,848 A | 7/1980 | Verwey et al. | |
| 4,255,074 A | 3/1981 | Meratti et al. | |
| 4,271,755 A | 6/1981 | Kintgen et al. | |
| 4,302,140 A | 11/1981 | Donnelly et al. | |
| 4,442,932 A | 4/1984 | Sashiki et al. | |
| 4,593,517 A | 6/1986 | Mattila | |
| 4,638,903 A | 1/1987 | Kimura | |
| 4,704,060 A | 11/1987 | Winski et al. | |
| 4,708,564 A | 11/1987 | Mylrea et al. | |
| 4,744,457 A | 5/1988 | Takimoto | |
| 4,898,511 A | 2/1990 | Rossig et al. | |
| 5,005,335 A | 4/1991 | Yourgalite et al. | |
| 5,051,058 A | 9/1991 | Roth | |
| 5,087,169 A | 2/1992 | Tubke | |
| 5,098,254 A | 3/1992 | Becicka et al. | |
| 5,169,284 A | 12/1992 | Berger et al. | |
| 5,181,820 A | 1/1993 | Sjogren et al. | |
| 5,193,973 A | 3/1993 | Tubke | |
| 5,263,813 A * | 11/1993 | Kiederle | B65G 47/90 294/67.31 |
| 5,335,903 A | 8/1994 | Martin et al. | |
| 5,348,440 A | 9/1994 | Focke | |
| 5,360,306 A | 11/1994 | Nakayama et al. | |
| 5,372,472 A | 12/1994 | Wlnski et al. | |
| 5,375,396 A | 12/1994 | Hüwelmann | |
| 5,407,055 A | 4/1995 | Tanaka | |
| 5,435,690 A | 7/1995 | Binning | |
| 5,507,616 A * | 4/1996 | Perobelli | B65G 57/00 198/781.01 |
| 5,540,545 A | 7/1996 | Roberts et al. | |
| 5,607,282 A | 3/1997 | Brannen et al. | |
| 5,623,808 A | 4/1997 | Franklin et al. | |
| 5,701,722 A | 12/1997 | Franklin et al. | |
| 5,738,484 A | 4/1998 | Taylor | |
| 5,758,471 A | 6/1998 | Denley et al. | |
| 5,842,827 A | 12/1998 | Kwasniewski et al. | |
| 5,844,807 A * | 12/1998 | Anderson | B65G 57/245 700/217 |
| 5,873,214 A | 2/1999 | Moore et al. | |
| 5,893,258 A | 4/1999 | Lancaster, III | |
| 5,927,927 A | 7/1999 | Anderson et al. | |
| 5,944,479 A | 8/1999 | Kanaya et al. | |
| 6,056,496 A | 5/2000 | Myers et al. | |
| 6,164,900 A | 12/2000 | Labell et al. | |
| 6,264,422 B1 | 7/2001 | Hennes et al. | |
| 6,453,784 B1 | 9/2002 | Cotteverte et al. | |
| 6,533,533 B1 | 3/2003 | Heston | |
| 6,594,970 B1 | 7/2003 | Hyne et al. | |
| 6,602,037 B2 | 8/2003 | Winkler | |
| 6,678,582 B2 | 1/2004 | Waled | |
| 6,817,824 B2 | 11/2004 | Winkler | |
| 6,845,860 B1 | 1/2005 | Walker | |
| 6,866,469 B2 | 3/2005 | Harris et al. | |
| 6,880,311 B2 | 4/2005 | Winkler | |
| 6,915,904 B2 | 7/2005 | Winkler | |
| 7,047,710 B2 | 5/2006 | Winkler | |
| 7,097,045 B2 | 8/2006 | Winkler | |
| 7,153,085 B2 | 12/2006 | Clark et al. | |
| 7,244,093 B2 | 7/2007 | Watanabe et al. | |
| 7,266,422 B1 | 9/2007 | DeMotte et al. | |
| 7,296,834 B2 | 11/2007 | Clark et al. | |
| 7,309,203 B2 | 12/2007 | Clark et al. | |
| 7,686,153 B2 | 3/2010 | Tsai | |
| 7,938,614 B2 | 5/2011 | Fritzsche | |
| 8,074,431 B1 | 12/2011 | Pierson et al. | |
| 8,145,350 B2 * | 3/2012 | Lancaster, III | B65G 61/00 700/217 |
| 8,257,011 B2 * | 9/2012 | Pierson | B65G 57/24 414/792.6 |
| 8,468,781 B2 | 6/2013 | Fritzsche et al. | |
| 8,583,277 B2 * | 11/2013 | Kuehnemann | B65G 61/00 700/217 |
| 8,622,685 B2 * | 1/2014 | Van Schijndel | B65G 57/06 414/793.5 |
| 9,315,337 B2 | 4/2016 | Cavelius | |
| 9,738,462 B2 | 8/2017 | Cavelius | |
| 9,776,812 B2 | 10/2017 | Cavelius | |
| 9,862,556 B2 | 1/2018 | Cavelius | |
| 2004/0191049 A1 | 9/2004 | Winkler | |
| 2005/0166552 A1 | 8/2005 | Omo et al. | |
| 2006/0120850 A1 | 6/2006 | Clark et al. | |
| 2006/0182545 A1 | 8/2006 | Ray et al. | |
| 2007/0065270 A1 | 3/2007 | Schmetzer et al. | |
| 2008/0025832 A1 | 1/2008 | Pierson et al. | |
| 2008/0095601 A1 | 4/2008 | Yohe et al. | |
| 2009/0087295 A1 | 4/2009 | Fritzsche | |
| 2009/0138121 A1 | 5/2009 | Wicks et al. | |
| 2010/0178149 A1 | 7/2010 | Fritzsche | |
| 2010/0278625 A1 | 11/2010 | Wolkerstorfer | |
| 2011/0076128 A1 | 3/2011 | Johnsen et al. | |
| 2011/0276174 A1 * | 11/2011 | Bolzani | B65G 57/24 700/217 |
| 2011/0277423 A1 | 11/2011 | Magri | |
| 2012/0070263 A1 | 3/2012 | Van Schijndel et al. | |
| 2012/0283868 A1 * | 11/2012 | Rutt | G06Q 10/083 700/217 |
| 2015/0073588 A1 * | 3/2015 | Priebe | B65G 57/00 700/217 |
| 2015/0307291 A1 * | 10/2015 | Kolker | B65G 57/03 414/792.6 |

FOREIGN PATENT DOCUMENTS

| | | |
|---|---|---|
| DE | 1106692 B | 5/1961 |
| DE | 2011458 | 10/1970 |
| DE | 1931274 B2 | 4/1975 |
| DE | 2708160 | 9/1978 |
| DE | 2808129 A1 | 8/1979 |
| DE | 2945883 A1 | 5/1981 |
| DE | 3347474 A1 | 2/1985 |
| DE | 3614256 A1 | 10/1987 |
| DE | 3906922 A1 | 10/1989 |
| DE | 3835058 A1 | 4/1990 |
| DE | 4114215 A1 | 11/1992 |
| DE | 3712102 C2 | 5/1993 |
| DE | 4338801 A1 | 5/1995 |

(56) References Cited

FOREIGN PATENT DOCUMENTS

| | | |
|---|---|---|
| DE | 69615895 T2 | 4/2002 |
| DE | 102007016727 B4 | 6/2010 |
| DE | 2020100015150 U1 | 2/2011 |
| DE | 102012106109 A1 | 2/2014 |
| DE | 102013110045 A1 | 3/2015 |
| EP | 0487837 A1 | 8/1991 |
| EP | 0511529 A1 | 4/1992 |
| EP | 0487837 A1 | 6/1992 |
| EP | 0498263 A1 | 8/1992 |
| EP | 0561069 A1 | 9/1993 |
| EP | 1321396 A1 | 6/2003 |
| EP | 1550610 A1 | 7/2005 |
| EP | 1180487 A1 | 8/2006 |
| EP | 1462394 B1 | 8/2006 |
| EP | 2103556 A1 | 9/2009 |
| ES | 2409459 A1 | 6/2013 |
| FR | 1441128 | 4/1966 |
| FR | 2861714 | 11/2003 |
| FR | 2899203 A1 | 10/2007 |
| GB | 1214025 | 11/1970 |
| GB | 2003818 A | 3/1979 |
| GB | 2066201 A | 7/1981 |
| JP | H02215618 | 8/1990 |
| JP | 06115696 A | 4/1994 |
| JP | H0767417 | 3/1995 |
| NL | 1018885 | 9/2001 |
| WO | 2010047595 A1 | 4/2010 |
| WO | 2010059923 A1 | 5/2010 |
| WO | 2010086292 A1 | 8/2010 |
| WO | 2011009150 A1 | 1/2011 |
| WO | 20110088845 A1 | 7/2011 |

OTHER PUBLICATIONS

Written Opinion of the International Searching Authority from corresponding Patent Cooperation Treaty (PCT) Application No. PCT/EP2018/057276, indicated completed on Jun. 19, 2018.
Preliminary Report on Patentability of the International Searching Authority in English from corresponding Patent Cooperation Treaty (PCT) Application No. PCT/EP2018/057276, completed Oct. 1, 2019.

* cited by examiner

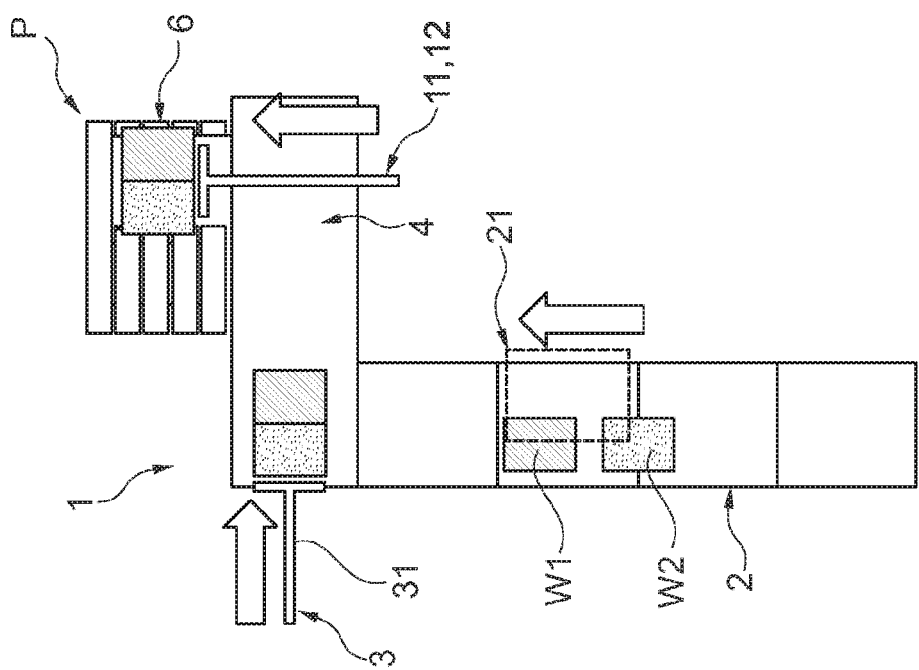
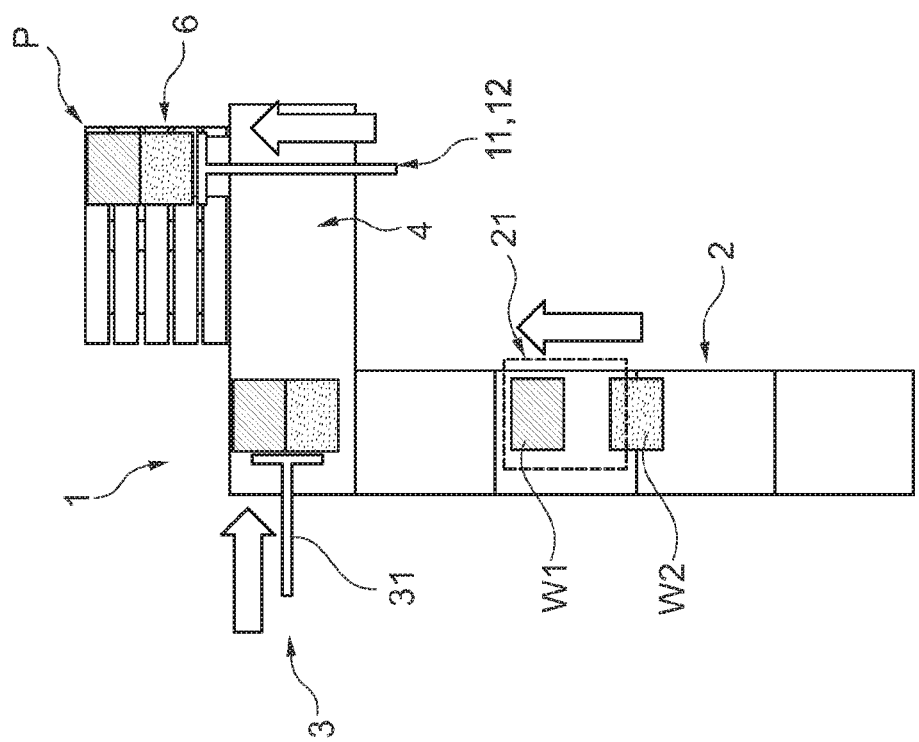

METHOD FOR AUTOMATICALLY STACKING PACKAGES IN LAYERS ON A SUPPORT

CROSS REFERENCE TO RELATED APPLICATION

The present application claims the priority benefits of International Patent Application No. PCT/EP2018/057276, filed Mar. 22, 2018, and claims benefit of German patent application DE 102017106746.9.

BACKGROUND AND FIELD OF THE INVENTION

The invention relates to a method and a system for the automatic stacking of packing pieces on a support in a predetermined spatial arrangement to form a stack.

The automatic stacking of packing pieces on a support or a carrier, in particular a pallet or roll car, to form a stack for subsequent dispatch, i.e. "palletizing", is known per se. However, in this regard packing pieces of uniform size or dimensions are placed at arithmetically determined locations by robots, grippers, etc.

In contrast, the process of automatically loading a load carrier with packing pieces of different specifications for forming a stack is so-called automatic "mixed-case" palletizing.

Nowadays, in distribution logistics, ever greater demands are placed on the order-picking process. It is thus necessary to develop order-picking systems which process orders automatically without manual intervention.

Thousands of different products (or packing pieces) in a wide variety of different designs (size, shape, weight, dimensions, surfaces, strength, compressibility, etc.) must be automatically picked by means of such systems.

In this regard, different aspects must be considered which greatly increase the complexity compared with "simple" manual stacking of simple regular geometries. For instance, a subsequent packing piece can only be effectively stacked or placed on a previous packing piece if the latter has a flat or planar surface which should also be oriented approximately horizontally, and if the packing piece can carry the weight of the further packing pieces placed on it without being damaged.

Furthermore, the formed stack should have a certain stability, inter alia so that it does not topple over during transport. Although wrapping the stack with film is helpful, this alone cannot stabilize a poorly formed stack.

Also, it is ever more frequently desirable for customers to have the stack optimized in terms of the desired unloading sequence.

Stacking of different packing pieces or goods of different sizes or dimensions thus occurs mostly by hand because the requirements of stability of the stack, packing density within the stack, loading sequence and the unloading sequence imposed thereby, and not least the stackability of goods are extremely high and so far have not been fulfilled, or have only been partly fulfilled, by the known methods and devices.

EP 1 462 394 B1 discloses a device for automatically loading a load carrier with load stack-forming packing units, i.e. a device for palletizing. In the device, the packing units are supplied stored and singulated on trays, and from there are placed on a packing table. There, the packing unit, lying on the table, is moved by a pusher along the broad side of the pallet to be loaded, until the loading coordinates in the X direction are reached. Then, another pusher and a loading tongue simultaneously push the packing unit in the direction of the load depth across the pallet until the loading coordinates in the Z direction are reached. Then, the loading tongue moves back and the pusher remains stationary and is used as a scraper so that the packing unit is set down on the pallet at the desired location in a "free falling" manner. The stack being formed is supported on the three other sides by a loading aid. It is thus stacked virtually "against the wall". However, moving on the packing table is time-consuming and has disadvantages when forming the packing pattern owing to the limited accessibility. Moreover, it is necessary for the loading tongue and the scraper/pusher to move simultaneously in the X direction. Also, only one packing unit can be "processed" sequentially.

WO 2010/059923 A1 discloses an automatic robot-assisted device for stacking, in which an intermediate plate is used for forming the first layer of a stack and for simultaneous pallet exchange.

SUMMARY OF THE INVENTION

The present invention provides a method for the automatic, multi-layered stacking of packing pieces of different dimensions on a carrier in a predetermined spatial arrangement, which permits, in a flexible manner, mixed-case stacking with a high throughput.

In accordance with aspects of the present invention, it has been recognized that when the predetermined sequence and the predetermined spatial position of the packing pieces are used to check with computer aid whether at least two packing pieces, which follow one another on a conveying path of the conveying equipment leading into the stacking device, can be transported together by the handler or handling means to the precalculated spatial positions on the carrier or the stack being formed on the carrier and, if possible, the successive packing pieces are handled together, then it is possible to increase the stacking through-put.

In other words, where possible packing pieces are handled together to form a stack. Therefore, at least two packing pieces are thus placed together in the stack and so the through-put is increased.

If joint handling is not possible, the packing pieces are handled individually in a known manner.

Joint handling thus primarily refers to horizontal grouping, in particular pairing, of successive packing pieces.

Preferably, successive packing pieces are grouped or paired for joint handling on the conveying path of the conveying equipment leading into the stacking device. Therefore, grouping and in particular pairing can occur in a simple manner by deliberately accumulating the packing pieces and then further handling them together. This can occur e.g. by accumulating or pushing together.

Additional vertical grouping in the sense of pre-stacking, as described in the applicant's DE 10 2013 110 045 A1, is also possible. Then, blocks consisting of packing pieces arranged next to one another and one above the other are handled together. This additionally accelerates the stacking process.

It may then be expedient to check, prior to transporting the respective packing piece to the respectively precalculated spatial position on the carrier or the stack being formed on the carrier, e.g. in the region of a pre-stacking unit, whether the current packing piece can be paired with the subsequent packing piece and additionally can be optionally placed on further subsequent packing pieces for pre-stacking, thus forming a block.

Should pre-stacking be possible, a first packing piece in the pre-stacking unit is raised, the subsequent second packing piece is positioned beneath the raised first packing piece and the first packing piece is lowered onto the second packing piece to form a pre-stack. In other words, the first packing piece is raised from the conveyor and the second packing piece is conveyed to the same location, whereupon the first packing piece is lowered to form the pre-stack. This process can be repeated for further packing pieces until a maximum stacking height is reached.

Then, the packing piece stack can be grouped or paired in terms of the invention in order to then be transported in a proven manner in the stacking unit to the precalculated spatial positions on the carrier or the stack being formed on the carrier.

The system in accordance with an aspect of the present invention is thus provided with a computer, wherein the computer is configured with programming means in order to check, using the sequence and spatial position of the packing pieces on the carrier, for at least two packing pieces following one another in the sequence, whether these can be grouped and optionally pre-stacked with further packing pieces one on top of the other and then transported together by the handler or handling means to the precalculated spatial positions on the carrier or the stack being formed on the carrier.

In one variant, the packing pieces can be moved together by the handling means on the carrier or the stack being formed on the carrier in such a way that their orientation with respect to each other remains unchanged. In other words, packing pieces conveyed one behind the other in the longitudinal direction, i.e. an elongate arrangement of packing pieces. E.g. two packing pieces placed end-to-end, are "placed" onto the stack in the longitudinal direction.

Preferably, the first packing piece is then passively moved from the second packing piece which for its part is actively moved. In other words, the handler or handling means engage the rear packing piece (as seen in the displacement direction) and this piece in turn moves the first packing piece. For example, a pusher could push the second packing piece and thus also push the packing pieces lying in front at the same time.

In another variant, in contrast the packing pieces are moved together by the handler or handling means on the carrier or the stack being formed on the carrier in such a way that their orientation with respect to each other is rotated by approximately 90 degrees. In other words, packing pieces conveyed one behind the other in the longitudinal direction are "placed" onto the stack arranged and oriented in the transverse direction. This can be achieved e.g. by the translator which is described further below. This allows packing pieces conveyed one behind the other to be arranged next to each other and then to be placed together.

Typically, the computer aided determination of the sequence and spatial position of the packing pieces of different dimensions in the stack to be formed on the carrier, the so-called palletizing plan, is calculated centrally in a superordinate controller after an order is received. In accordance with the invention, the computer aided check as to whether the successive packing pieces can be transported together by the handler or handling means to the precalculated spatial positions on the carrier or the stack being formed on the carrier occurs in the controller of the stacking device itself, in particular when the packing pieces are located on the conveying path leading into the stacking device.

Therefore, independent of the palletizing plan in the local controller of the stacking device, a check for possible joint handling takes place in a virtually ad hoc manner. This check preferably occurs shortly before entering the actual stacking cell, i.e. on the conveying path leading into the stacking device, because then simple joint grouping, e.g. by accumulation, is possible.

Therefore, the superordinate determination of the palletizing plan does not have to be changed. However, in principle it can also be optimized with respect to the grouping and conveying sequence in terms of the invention, for which purpose the corresponding algorithm is then changed so that more groupings are possible.

In accordance with an aspect of the present invention, the positioning conveyor can be formed as a travelling car or shuttle which can be moved in a reciprocating manner on rails arranged for this purpose in the X direction along the stacking area or support, and in each case transports a packing piece to the provided X position. Alternatively, a circulating endless conveyor or even a table with a pusher can also simply be provided as a positioning conveyor.

Preferably, the travelling car is formed with a C-shaped frame and so then the at least one pushing plate can engage between the limbs of the "C" and so no mutual interference occurs. This also allows the travelling car—after successfully "transferring" the packing piece to the pushing plate—to travel back to pick up the next packing piece from the supply conveyor before the end of the stacking process. The actual carrier surface for the packing piece is thus only secured on one side to the chassis of the travelling car and protrudes therefrom.

In order to ensure that the packing pieces do not fall from the travelling car, this can comprise a stop on the side facing away from the supply conveyor in the X direction or e.g. can comprise stops on the supply conveyor or travelling car which can also move in the X direction synchronously with the workpiece.

Alternatively, the stop can also be configured as a stop plate which can be pre-positioned in the X direction and is suspended on a carriage or crossbar arranged thereabove extending in the X direction and carrying the drive, wherein the plate is positioned in the X direction using the predetermined position of the respective packing piece.

DE 10 2012 106 109 A1 describes in detail a corresponding device for multi-layer stacking on a support and reference is made thereto in its entirety with respect to the configuration of a stacking device to be used within the scope of the invention. Therefore, only essential features will be discussed hereinafter.

If an individual pusher as in the prior art is not used but instead the pusher is formed as an arrangement of a plurality of individual pushers arranged horizontally and along the side of the stacking area, i.e. as a battery which performs the pushing of the packing pieces from the positioning conveyor in the direction of the stack, wherein the individual pushers can be moved in the Z direction independently of the at least one pushing plate in order to retain the packing piece during withdrawal of the pushing plate, the packing pieces can be positioned in a still more variable manner and also several packing pieces can be stacked with little time offset or even at the same time.

In a preferred embodiment, the at least one pushing plate is formed as a flat, strip-like plate which can move horizontally and along the side of the stacking area and transverse thereto and becomes thinner in the direction of the stacking area. The pushing plate is suspended on the side of the positioning conveyor opposite the carrier. It is secured there optionally on the same frame as the individual pushers. If more than one pushing plate is provided, these can be arranged in parallel next to one another.

A translator for the packing pieces can be arranged between the supply conveyor and the positioning conveyor. This can be formed as a pusher. It is possible for the pusher together with the travelling car to transport the packing piece to the desired X position, and so the packing piece is transported in a "clamped" manner virtually between the pusher and stop of the travelling car. Therefore, high accelerations and speeds during positioning are possible, without a risk of displacement, falling, etc.

Therefore, in one variant the pusher (translator) is driven and suspended in a movable manner on a rail extending along the carrier and running in parallel with the positioning conveyor. It is also feasible for the pusher to also travel only to prevent items falling, but to have no active effect on positioning. This is then primarily performed by the travelling car itself or by the above-mentioned movable stopper.

However, it is also feasible for the supply conveyor to carry the packing pieces directly to the positioning conveyor, without the intermediate use of a translator. For this purpose, in one variant the supply conveyor terminates perpendicular to the positioning conveyor and "pushes" the packing pieces directly onto the positioning conveyor.

On the whole, it is thus possible to stack items on the carrier in a flexible manner and at a high rate. In particular, a wide variety of different packing pieces can be stacked continuously. Therefore, in addition to the less challenging, uniform packing pieces which can of course likewise be handled, packing pieces with a wide variety of different dimensions can be successively stacked on the carrier.

The term 'packing pieces' includes a wide variety of goods, packed goods, goods packed in groups, such as cartons, crates, boxes, containers, goods on trays, packing units, such as e.g. film multi-packs of plastic bottles, etc. and also individual items of all types.

The term 'support' includes intermediate plates or carriers, such as pallets and roll cars, or similar supports for unit loads and packages thereof.

The term 'supply conveyor' includes conveyors in general and in particular roller conveyors, conveyor belts and conveying systems. These can be loaded manually or automatically. The packing pieces are singulated and delivered on the conveying equipment in the correct sequence for the desired packing sequence. The correct sequence is determined arithmetically when processing an order. Corresponding software for this is known. The particular feature is that the packing pieces are delivered on the supply conveyor without aids such as trays, containers, etc.

It is also favorable if the packing pieces are oriented by the displacement means prior to transfer. This permits a standardized and thus simplified transfer of the packing pieces by the displacement means. Alternatively or in addition, corresponding optical methods for recognizing the orientation of the packing pieces and controlling the displacement means can also be used in order to achieve the orientation therewith. The orientation can be effected e.g. by the translator. The movable stop can also be used for orientation.

Further details of the invention will become clear from the following description of exemplified embodiments by reference to the drawings.

BRIEF DESCRIPTION OF THE DRAWINGS

FIG. 5A is a schematic view of the joint handling of paired packing pieces;

FIG. 5B is another schematic view of the joint handling of paired packing pieces;

DESCRIPTION OF THE PREFERRED EMBODIMENTS

Figure 1:
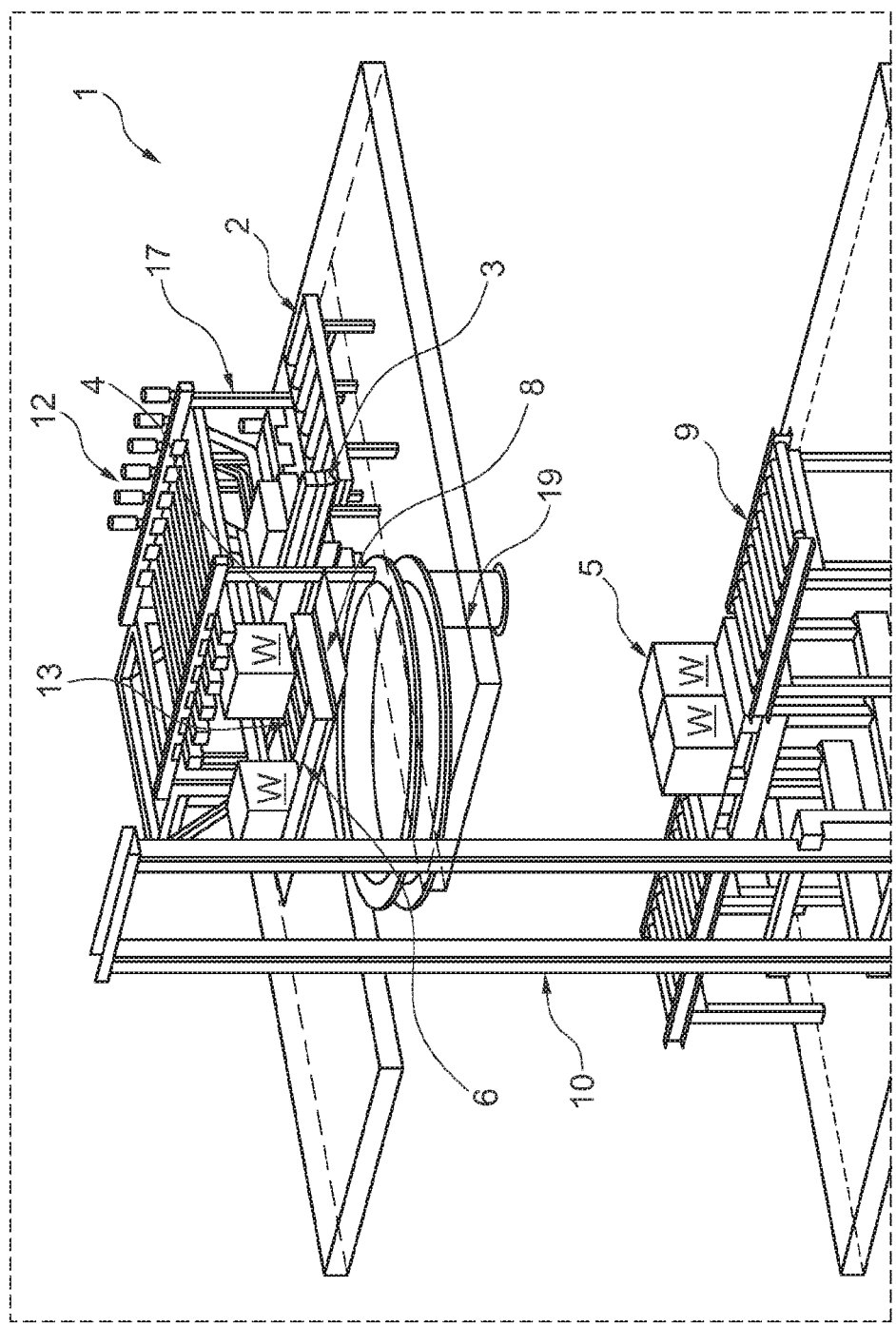
FIG. 1 shows a schematic, perspective view of a device for automatically stacking on pallets in multiple layers at the beginning of the formation of the first layer.
Figure 2:
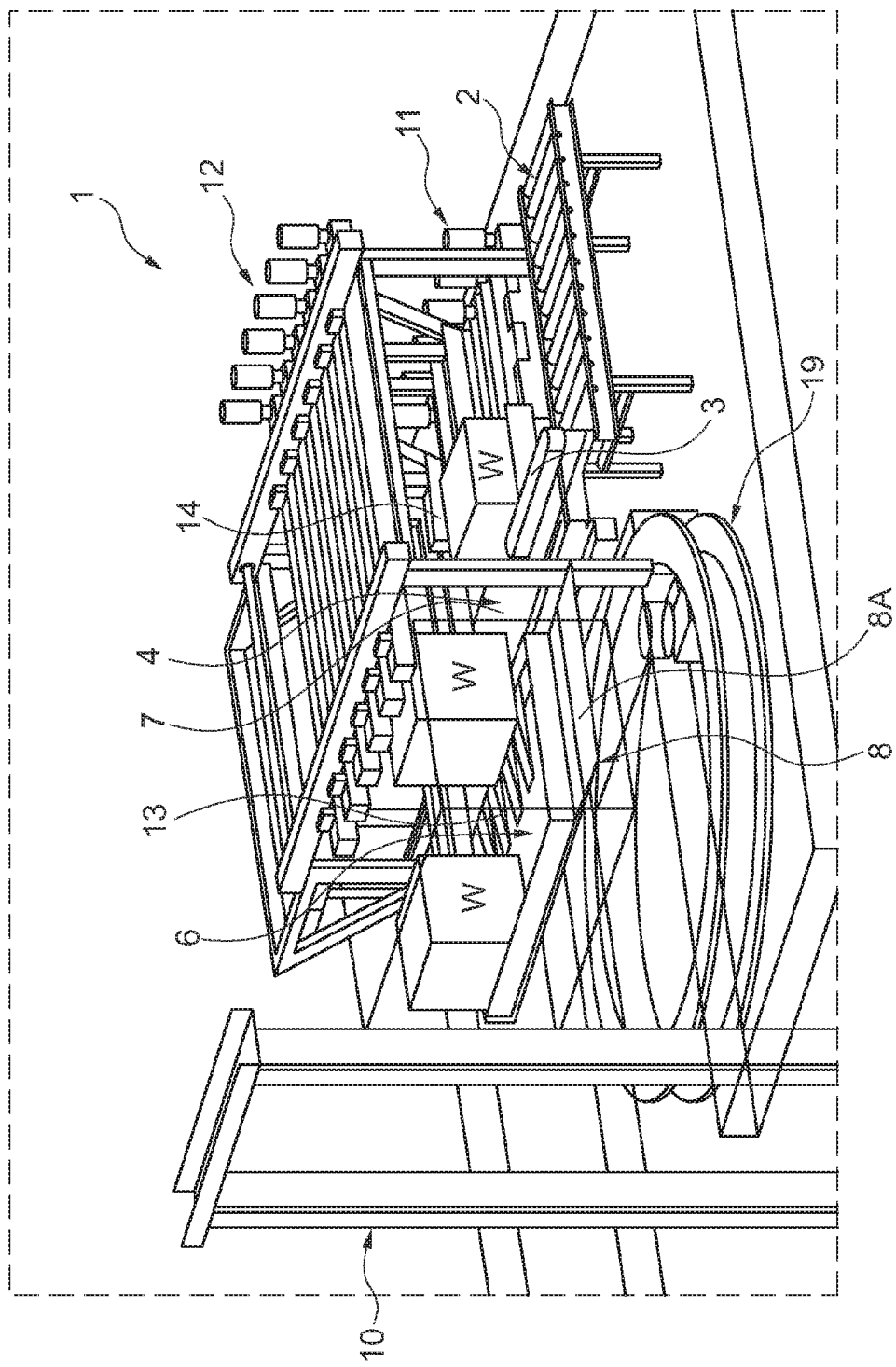
FIG. 2 shows an enlarged schematic side view of the device from FIG. 1 in the region of the endless conveyor.
Figure 3:
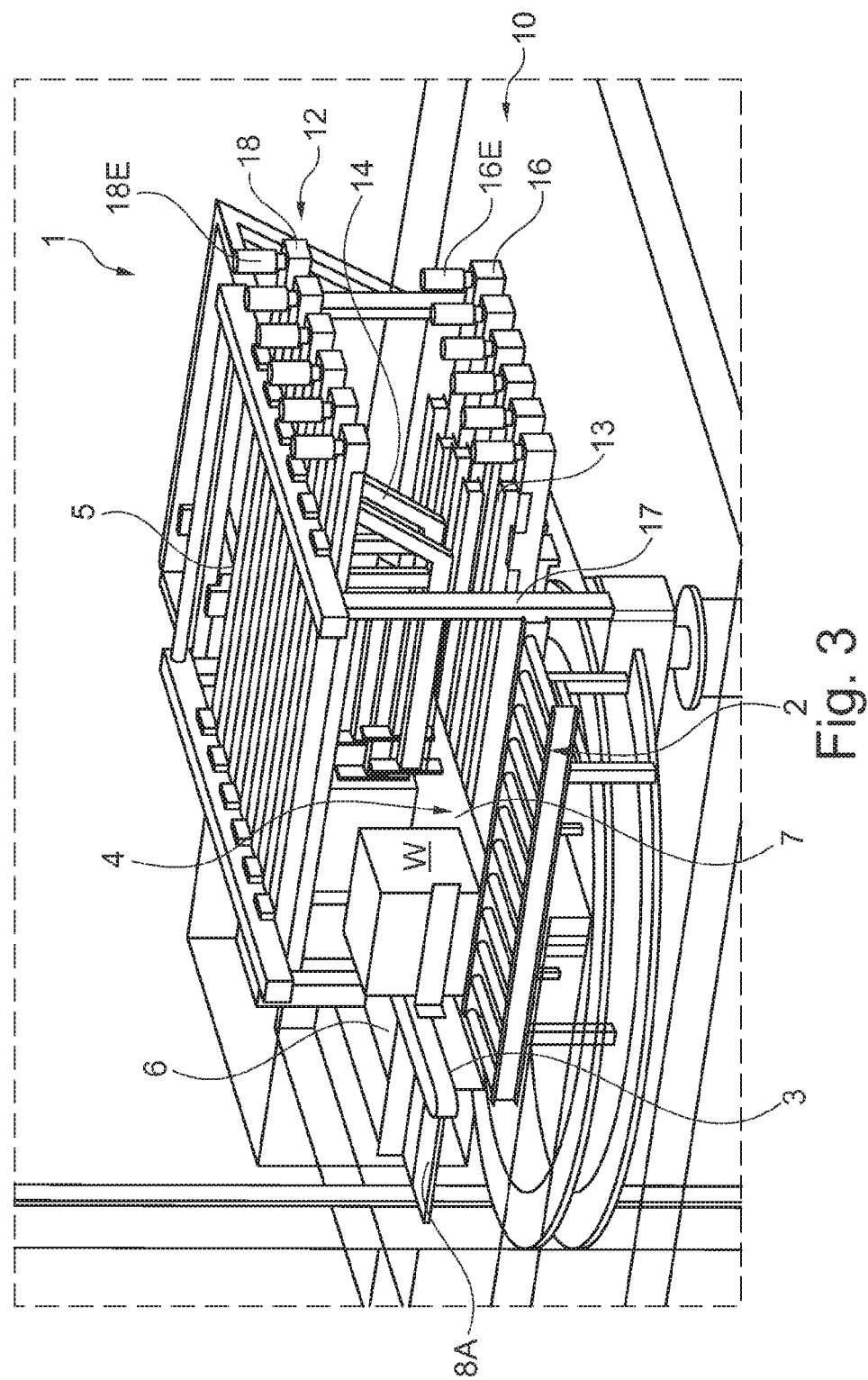
FIG. 3 is a view corresponding to FIG. 2 from a different viewing angle.
Figure 4:
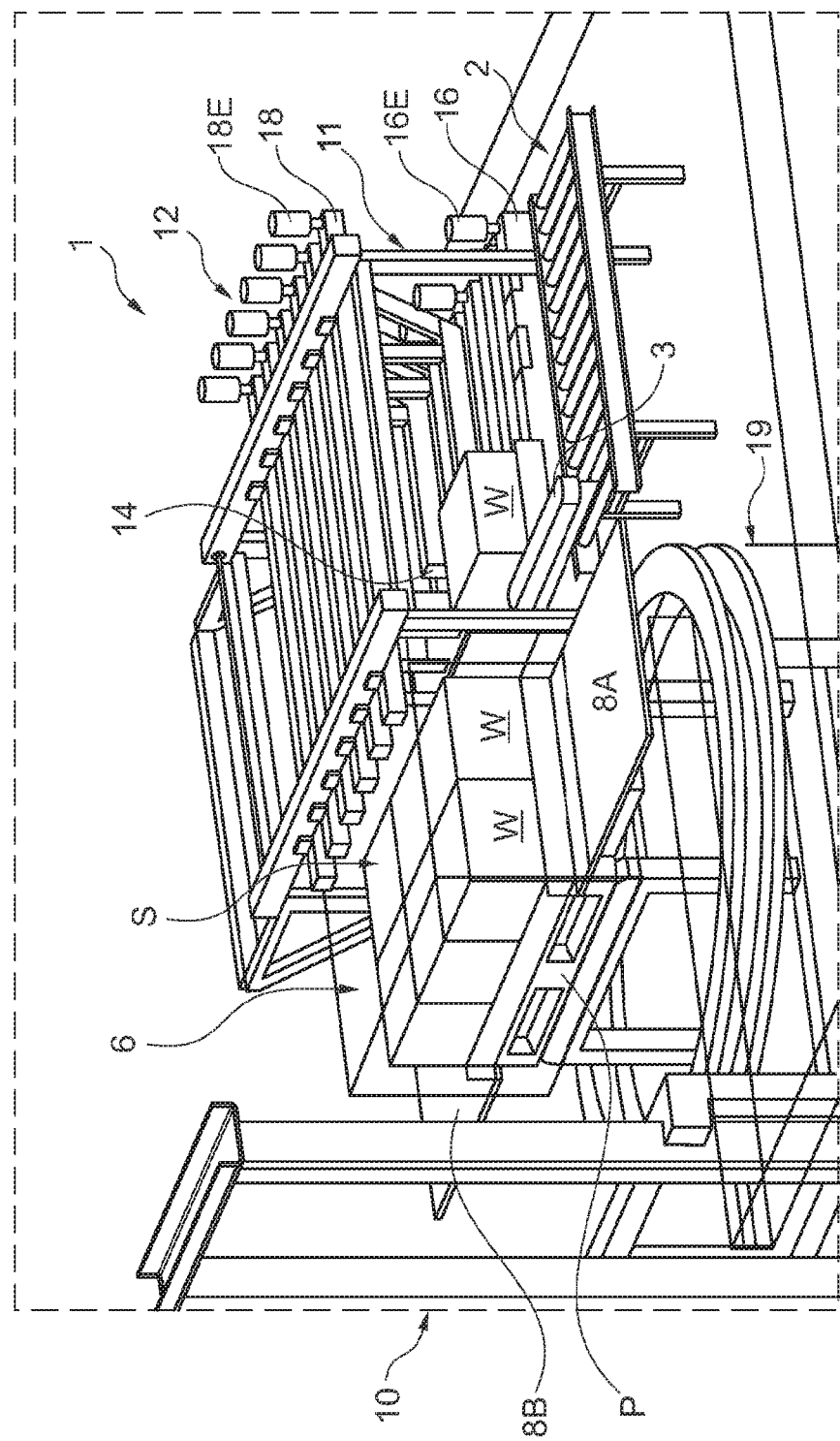
FIG. 4 is a view corresponding to FIG. 2 after producing the first layer.

FIGS. 1 to 7 show a device, designated as a whole by reference numeral 1, for automatically stacking packing pieces W of different dimensions on pallets P in multiple layers in a predetermined spatial arrangement. This is thus a device for "mixed case" palletizing. Of course, merely similar packing pieces W can also be palletized using the device 1.

For improved understanding, the singular term 'packing piece' will be used hereinafter with it being clear that the description also includes jointly handled packing pieces.

The device 1 includes a roller conveyor 2 as a supply conveyor which provides the singulated packing pieces W in a computer aided pre-determined sequence from a store, not shown. The roller conveyor 2, as the supply conveyor, comprises a plurality of individually controllable accumulation zones in the region of arrival into the stacking device.

A translator 31 formed as a pusher 3 is arranged at the end of the roller conveyor 2 and translates the packing pieces W by 90 degrees and discharges them onto the subsequent positioning conveyor. The packing pieces W are likewise oriented angularly so that they are oriented on the positioning conveyor 4, so long as their external shape allows this.

The positioning conveyor 4 is formed as a travelling car. The packing pieces W are positioned in the X direction thereby in order to take up these coordinates of the subsequent position in the stack.

In order to precisely maintain the positioning, a stopper 5 is provided which is actuated to be movable relative to the conveyor belt in the X direction in order to "stop" the respective packing piece. Depending upon the type of system, the use of a stopper for positioning the packing piece is not necessarily required and can be omitted. Driving is effected via a toothed belt (not shown) which is arranged on the linear spindle and in which the stopper 5 is suspended.

The positioning conveyor or the travelling car, or more precisely the transport surface thereof, is arranged horizontally at the same level and along one side of the area 6 for stack formation. The carrier P (pallet) or roll car to be loaded will typically be arranged in this location.

An intermediate plate 8 is provided in the area 6 at the level of the transport surface above the carrier P to be loaded. The intermediate plate 8 is divided centrally and each part 8A, B is configured to be displaceable towards the side (in the X direction) in such a manner that a stack is formed on the intermediate plate 8 whilst the completely loaded carrier P of the previous stacking process thereunder is replaced by a new empty carrier P. Therefore, the stacking process can continue without interruption. In order to supply empty pallets or convey away stacked pallets, a corresponding roller conveyor 9 is provided beneath the stacking area 6.

The respective pallet P is picked up from the roller conveyor and moved upwards to the stacking area 6 by a lifting and lowering unit 10 for lifting and lowering the carrier P in the Y direction. The lifting and lowering unit 10 is also itself responsible for level matching during stacking and thus performs a lifting or lowering motion if required during stacking of a packing piece W and also performs adjustment of the balance of the layers at the beginning of a new layer.

The respective packing piece W is pushed off the travelling car 4, i.e. to the desired position in the stack, laterally into the area 6 on the intermediate plate 8 in the Z direction.

For this displacement of the packing pieces W to the predetermined position in the stack S, the device includes pushing plates 11 and a pusher battery 12, i.e. in each case a plurality of individual pushing plates 13 and individual pushers 14 arranged next to each other horizontally and along the side of the stacking area 6 or the pallet P. The pushing plates 13 engage between the frame 7 of the travelling car 4 and pick up the packing piece W pushed off by the pusher 14. Then, the pusher and the pushing plate together move to the desired position and the pushing plate 13 is withdrawn whilst the pusher 14 remains stationary to retain the packing piece W. The packing piece W is thereby positioned. The pushing plates 13 taper at the front at a shallow angle so that positioning can occur as precisely as possible.

The pushing plates 13 are each formed as flat, strip-like plates which can move horizontally and along the side of the stacking area 6 and transversely thereto and become thinner in the direction of the stacking area 6.

The pushing plates 13 are suspended on the side of the travelling car 4 opposite the carrier and are arranged in parallel with and next to each other. They can move back and forth in a carriage-like manner in each case on a linear spindle 16 oriented in the Z direction. Driving occurs for each spindle via an electric motor 16E and a toothed belt (not shown) which is arranged on the linear spindle and in which the carriage or the pushing plate 13 is suspended.

The pushing plates 13 thus form a type of optional widening of the travelling car 4 into the stacking area 6.

The pushers 14 are arranged flush with each other horizontally and along the side of the stacking area 6 or the carrier P and are formed to be displaceable independently of one another. They are arranged on the side of the positioning conveyor opposite the carrier or are located there in the rest position in order to be extended via the travelling car 4 to push off packing pieces.

As per the pushing plates, the pushers are also arranged over the entire length of the stacking area 6 or the pallets P and are secured to a frame 17 spanned above the positioning conveyor. At that location, they can move back and forth in a carriage-like manner in each case on a linear spindle 18 oriented in the Z direction. Driving occurs for each spindle via an electric motor 18E and via a toothed belt (not shown) which is arranged on the linear spindle and in which the carriage or the pushers 14 are suspended.

Both the stopper 5 and also the pushers 14 extend from the respective linear spindle downwards to a height only just above the surface of the conveyor belt 4 and, at that end, have a foot with an enlarged surface area in order to handle the packing pieces W in a more efficient and more secure manner.

Provided beneath the stacking area 6 is a unit 19 for wrapping the formed stack S with a film.

Wrapping occurs gradually layer-by-layer during stacking or after stacking a layer. The carrier P with the already formed layers of the stack S is lowered gradually downwards by the lifting and lowering unit 10 and thus moves through the annular unit 19 for wrapping.

If the entire stack S is finished, the stack S is transferred to the pallet P and moved downwards and transported away via the roller conveyor 9.

At the same time, the intermediate plate 8 is closed and stacking continues thereon to form the next stack of the next order.

Overall, for automatically stacking packing pieces W on a pallet P in a predetermined spatial arrangement for forming a stack S, the sequence and spatial position of the packing pieces W on the pallet P are computer aided determined using the underlying order to form a stack S.

Then, the packing pieces W, W1, W2 are fetched from a store etc. singulated without aids (trays, etc.) in a predetermined sequence, required for this purpose, by means of the supply conveyor 2.

Still on the supply conveyor 2 (cf. FIGS. 5A, B), the predetermined sequence and the predetermined spatial position of the packing pieces W1, W2, i.e. the palletizing plan, are used to computer aided check, in the local controller of the device 1, whether at least two packing pieces W1, W2 which follow one another on the conveying path 2 leading into the stacking device can be transported together by the handler or displacing means 3, 4, 11, 12 to the precalculated spatial positions on the carrier P or the stack S being formed on the carrier P and, if possible, the successive packing pieces W1, W2 are handled together. For this purpose, the palletizing plan in the local controller is used to check whether the following critical criteria are met:

the packing pieces W1, W2, which can be handled together, as a group have a length smaller than the width of the travelling car 4;

the packing pieces W1, W2, which can be handled together, as a group have a width smaller than the length of the travelling car 4;

the packing pieces W1, W2, which can be handled together, as a group have a width smaller than the width of the pushing plate(s) 11 which are used.

The palletizing plan is thus present independently of the superordinate controller or the calculation in the local controller and so the device 1 can use the thus present packing piece list and the calculated spatial positions thereof in the stack to perform the check. Therefore, this function is performed in a completely self-contained manner which is advantageous in the event of malfunctions.

Further criteria take into account the dynamics of the process of placing onto the carrier, e.g. that the packing pieces are not hampered when being set down ("falling") or that the heights of the packing pieces are not so different that tilting or shifting occurs. In addition, it is also taken into account that the axes through the centers of gravity of the packing pieces should run in parallel with the movement axis (during passive pushing).

If these criteria are met, in the variant of FIG. 5A the successive packing pieces W1, W2 are grouped or paired by means of accumulation and are then placed together on the carrier P by the translator 3 and the travelling car 4 and the pushing plates 11 and pusher battery 12.

In so doing, the orientation of the packing pieces W1 and W2 with respect to each other does not change and the first packing piece W1 is passively moved by the second packing piece W2 which for its part is actively moved by the pusher battery 12 because it acts thereon at this location.

Alternatively, in the variant of FIG. 5B the successive packing pieces W1, W2 are grouped or paired by means of the translator 3 and are then placed together on the carrier P by the translator 3 and the travelling car 4 and the pushing plates 11 and pusher battery 12. In so doing, the packing pieces W1, W2 are moved by the translator 3 such that their orientation with respect to each other is rotated by approximately 90 degrees.

It is also possible to set down the thus grouped packing pieces W1, W2 (or similarly packing piece stack) individually on the load carrier or pallet and so e.g. a desired distance therebetween is achieved. In particular, this can occur in the variant of FIG. 5A in that the packing piece (W1) at the front on the pushing plate 11 is placed first and then the pushing plate 11 is moved and subsequently the rear packing piece (W2) is placed.

If joint handling or grouping is not possible, the packing pieces W to be loaded are then individually translated by the translator 3 from the supply conveyor 2 to the travelling car 4.

By means thereof and by means of the pusher battery 12 and the pushing plates 13, the respective packing piece W is transported to the predetermined spatial position on the pallet P or the stacking area 6 or intermediate plate 8 in the stack being formed.

Depending upon requirements, the pallet P is lowered or raised in the Y direction by the corresponding unit 10.

The travelling car 4 picks up individual packing pieces W from the supply conveyor 2. For this purpose, the translator 31 pushes the packing pieces from the supply conveyor 2 to the travelling car 4.

The travelling car 4 has a movable stop 32 on the remote side in order to prevent the packing pieces 4 from falling off the actual transport surface 35 and to permit precise positioning. Alternatively, the stop is designed as a pre-positionable stop plate—almost a reverse pusher—and is already located at the respective X position.

In order for the packing piece W (or the packing pieces or the group) to not fall down during acceleration of the travelling car 4, the translator 31 is moved in the X direction synchronously with the travelling car 4, and so the respective packing piece is transported on the travelling car 4 clamped between the stop 5 and the translator 31.

The device 1 is thus suitable not only for loading pallets P but also for loading roll cars.

Figure 6:
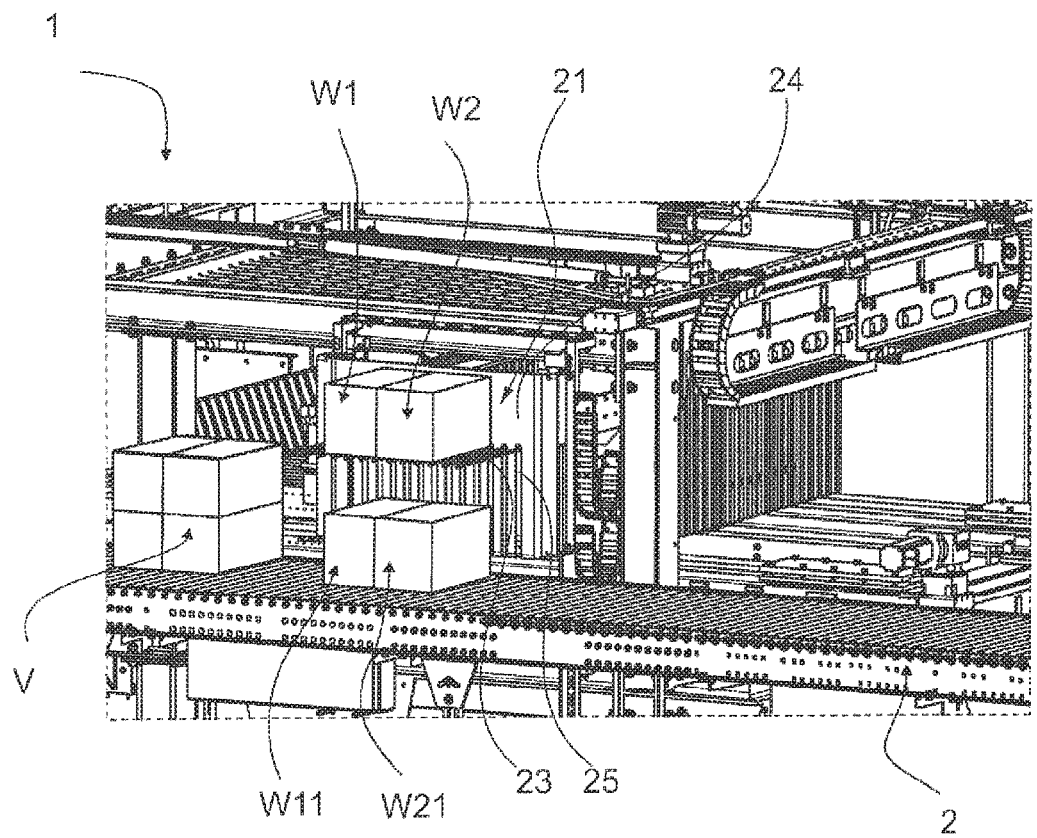
FIG. 6 is a view corresponding to FIG. 3 incorporating a pre-stacking unit.

As shown in FIG. 6, the device 1 can additionally comprise a pre-stacking unit 21 which is arranged in the region of the roller conveyor 2 upstream of the translator formed as a pusher 3, which unit is used to further increase the through-put when automatically stacking packing pieces W, if possible, for which purpose further packing pieces are placed one above the other for pre-stacking, in addition to horizontal grouping, before the packing pieces are then translated together and stacked as described above.

When delivering to the device 1 (cf. above), it is also computer aided checked whether it is additionally possible for a pre-stack to be formed. For this purpose, it is likewise calculated e.g. for at least two packing pieces W1, W2 which follow one another in the sequence whether these can be pre-stacked one on top of another and can be transported together (with the already horizontally grouped packing pieces) as a pre-stack V (or block) to the precalculated spatial positions on the carrier P or the stack S being formed on the carrier P.

If the system or the computer recognizes such a possibility, the packing pieces W1, W2 respectively travelling in front are raised in the pre-stacking unit 21, the subsequent packing pieces W11, W21 are positioned beneath the raised packing pieces by means of the roller conveyor 2 and lowered to form a pre-stack V.

In a similar manner to the above process for individual packing pieces W, this pre-stack V will be transported to the precalculated spatial positions on the carrier P or the stack S being formed on the carrier.

For this purpose, the pre-stacking unit 21 comprises a lifting and lowering mechanism 22 for raising and lowering a packing piece W with a fork 23 which can be raised and lowered, in order to raise the respective packing piece from the roller conveyor 2.

The fork 23 of the lifting and lowering mechanism 22 can likewise be displaced transversely to the lifting or lowering movement direction so that it can be "pushed under" or "pulled out from under" the packing piece W. It thus engages with its prongs between the rollers of the conveyor 2. For this purpose, the prongs can be moved back and forth perpendicular to the conveying direction of the conveyor 2.

In order for the above-lying packing pieces W1, W2 to not slip during withdrawal of the fork 23 or the prongs thereof, the lifting and lowering mechanism 22 has a slotted retaining plate 24 which is fixed with respect to the fork 23. The slots 25 extend vertically and so the prongs of the fork 23 can engage therethrough (during back-and-forth movement) and likewise can be raised or lowered vertically.

Figure 7:
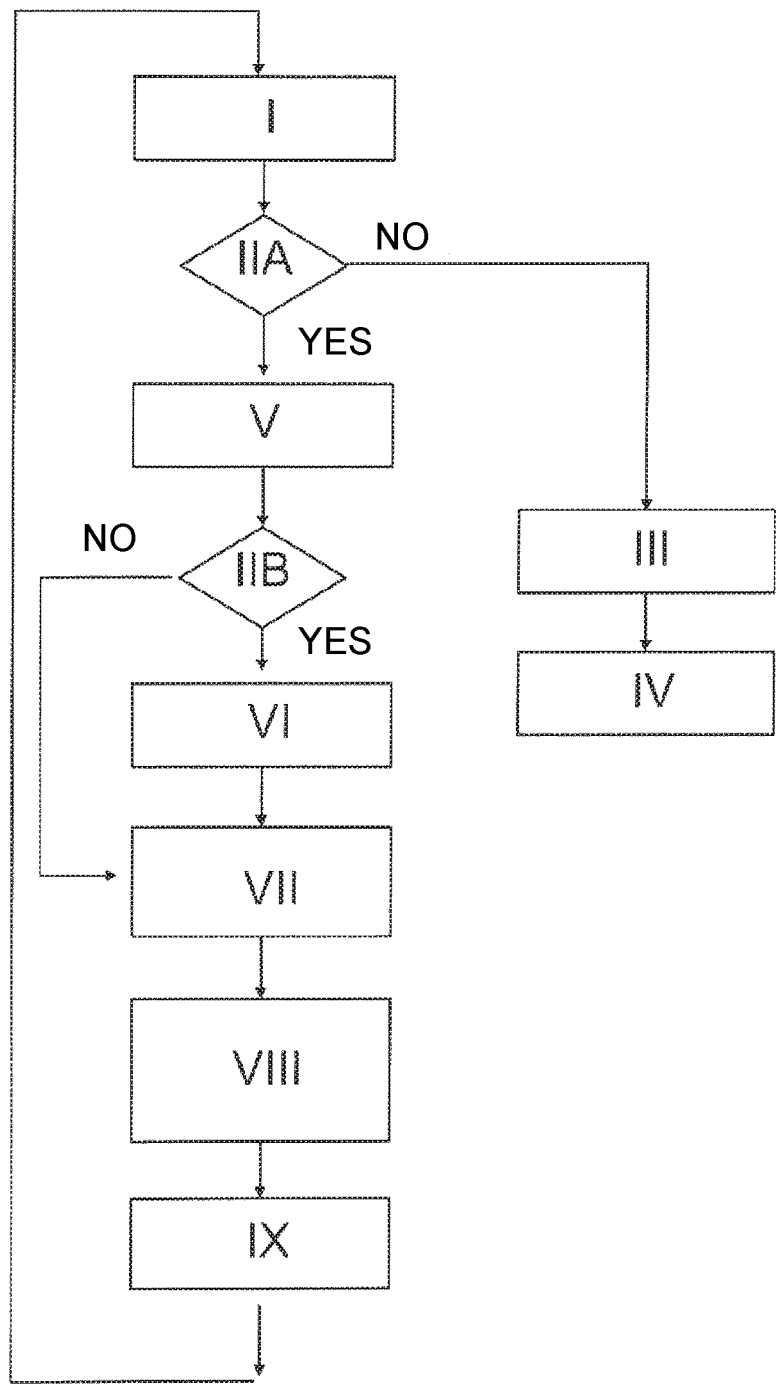
FIG. 7 is a flow diagram of the process of pre-stacking.

With the packing pieces W now arriving on the roller conveyor 2 (step I), the process continues as described below (cf. FIG. 7).

Initially, in step II it is computer aided checked in the device itself using the palletizing plan whether A) horizontal grouping of the next successive packing pieces W1, W2 is possible and then whether B) in addition pre-stacking with further (accordingly paired) packing pieces W11, W21 is possible.

When this is not the case, the packing pieces W are conveyed according to step III without grouping by being pushed together or handling by the pre-stacking unit 21 and are palletized individually "as normal" as described above, i.e. transported to the precalculated position in the stack S (step IV).

If horizontal pairing of the packing pieces W1, W2 is possible, these are accordingly accumulated on the supply conveyor 2 so that they are pushed together (step V).

If pre-stacking is likewise possible, the grouped packing pieces W1, W2 are positioned in the pre-stacking unit 21 on the conveyor 2 (step VI).

Then, the prongs of the fork 23 are extended and lift the packing pieces W1, W2 to a defined height (step VI) such that the packing pieces W1, W2, including the prongs, are arranged only slightly higher than necessary in order to permit subsequent positioning of the likewise paired packing pieces W11, W21.

Then, the paired packing pieces W11, W21 are positioned by means of the roller conveyor 2 in the pre-stacking unit 21 (step VII) such that they are arranged directly centrally beneath the raised packing pieces W1, W2.

Thereafter, in step VIII the prongs are withdrawn and the packing pieces W1, W2 are then held in position by the retaining plate 24. As soon as the prongs are completely withdrawn, the upper packing pieces W1, W2 come to lie on the lower packing pieces W11, W21 and thus form a pre-stack V or block.

The pre-stack V is then (step IX) palletized, i.e. transported to the precalculated position in the stack S, in precisely the same manner as if it were an individual packing piece W.

It will be understood that the reverse process—first stacking, then grouping—is also possible.

The invention claimed is:

1. A method for an automatic, multi-layered stacking of packing pieces of different dimensions on a carrier in a predetermined spatial arrangement to form a stack, comprising the steps of:
computerized determining of a sequence and spatial position of the packing pieces in the stack to be formed on the carrier to generate a predetermined sequence and predetermined spatial positions of the packing pieces, wherein the packing pieces include packing pieces of different dimensions;
obtaining the packing pieces in a singulated sequence by conveying equipment;
transporting the packing pieces to be loaded from the conveying equipment to the predetermined spatial positions on the carrier or the stack being formed on the carrier by a handler of a stacking device to form the stack;
computerized checking using the predetermined sequence and the predetermined spatial position of the packing pieces as to whether at least two packing pieces that follow one another on a conveying path of the conveying equipment leading into the stacking device can be transported together by the handler to the predetermined spatial positions on the carrier or the stack being formed on the carrier; and
wherein the at least two successive packing pieces are handled together if it is determined in said computerized checking using the predetermined sequence and the predetermined spatial positions that the at least two successive packing pieces can be handled together.

2. The method as claimed in claim 1, wherein the at least two successive packing pieces are grouped for joint handling on the conveying path of the conveying equipment leading into the stacking device.

3. The method as claimed in claim 2, wherein the at least two packing pieces are moved together by the handler on the carrier or the stack being formed on the carrier in such a way that their orientation with respect to each other remains unchanged.

4. The method as claimed in claim 3, wherein a first packing piece of the at least two packing pieces is moved passively by a second packing piece of the at least two packing pieces, and wherein the second packing piece is actively moved.

5. The method as claimed in claim 1, wherein the at least two packing pieces are moved together by the handler on to the carrier or the stack being formed on the carrier in such a way that their orientation with respect to each other is rotated by approximately 90 degrees.

6. The method as claimed in claim 1, wherein said computerized checking using the predetermined sequence and the predetermined spatial positions comprises checking with a controller of the stacking device whether the at least two successive packing pieces can be transported together by the handler to the predetermined spatial positions on the carrier or the stack being formed on the carrier when the at least two packing pieces are located on the conveying path leading into the stacking device.

7. The method as claimed in claim 1, wherein the stacking device comprises at least one supply conveyor leading into the stacking device that provides the at least two packing pieces in a predetermined sequence;
a controller for said computerized checking using the predetermined sequence and predetermined spatial positions as to whether the at least two packing pieces that follow one another on the supply conveyor can be transported together to the predetermined spatial positions on the carrier or the stack being formed on the carrier; and
wherein the handler comprises a displacing means, adjoining a discharge end of the supply conveyor, which picks up the at least two packing pieces together from the supply conveyor and transports them to the predetermined spatial positions in the stack for the at least two packing pieces;
wherein the displacing means comprises:
a positioning conveyor adjoining the discharge end of the supply conveyor, which is arranged horizontally and along one side of a stacking area in order to position the at least two packing pieces together in an X direction; and
at least one pushing plate and one pusher in order to transport the at least two packing pieces together from the positioning conveyor in a Z direction to the predetermined spatial positions in the stack.

8. The method as claimed in claim 7, wherein the at least one pushing plate is formed as a flat, strip-like plate that can move horizontally and along the side of the stacking area and transverse thereto in order to pick up the at least two packing pieces when the packing pieces are pushed by the pusher from the positioning conveyor to the X direction position and to place them in the Z direction on the carrier or in the stack.

9. The method as claimed in claim 7, wherein the at least two packing pieces are positioned in the X direction by a positioning conveyor formed as a travelling car which can travel in the X direction.

10. The method as claimed in claim 1, wherein an additional arithmetical check is performed to determine whether the at least two packing pieces can be pre-stacked one on top of another and can be transported together by the handler as a pre-stack to the predetermined spatial positions on the carrier or the stack being formed on the carrier.

11. The method as claimed in claim 1, wherein the at least two successive packing pieces are grouped when
the packing pieces, which can be handled together, as a group have a length smaller than a width of a travelling car or a shuttle; and/or
the packing pieces, which can be handled together, as a group have the width smaller than a length of the shuttle.

12. The method as claimed in claim 1, wherein the at least two packing pieces are moved together by a translator on the carrier or the stack being formed on the carrier in such a way that their orientation with respect to each other remains unchanged.

13. The method as claimed in claim 2, wherein the at least two packing pieces are moved together by a translator on the carrier or the stack being formed on the carrier in such a way that their orientation with respect to each other is rotated by approximately 90 degrees.

14. The method as claimed in claim 8, wherein the at least two packing pieces are positioned in the X direction by means of a positioning conveyor formed as a travelling car which can travel in the X direction.

15. The method as claimed in claim 7, wherein the at least two successive packing pieces are grouped when
- the packing pieces, which can be handled together, as a group have a length smaller than a width of a travelling car or a shuttle; and/or
- the packing pieces, which can be handled together, as a group have the width smaller than a length of the shuttle; and/or
- the packing pieces, which can be handled together, as a group have the width smaller than a width of the at least one pushing plate.

16. The method as claimed in claim 7, wherein an additional arithmetical check is performed to determine whether the at least two packing pieces can be pre-stacked one on top of another and can be transported together by the handler as a pre-stack to the predetermined spatial positions on the carrier or the stack being formed on the carrier.

* * * * *